US008867072B2

(12) United States Patent
Mori (10) Patent No.: US 8,867,072 B2
(45) Date of Patent: Oct. 21, 2014

(54) INFORMATION PROCESSING APPARATUS, CONTROL METHOD THEREFOR, AND COMPUTER-READABLE MEDIUM

(75) Inventor: Namihiro Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 13/179,456

(22) Filed: Jul. 8, 2011

(65) Prior Publication Data

US 2012/0033253 A1 Feb. 9, 2012

(30) Foreign Application Priority Data

Aug. 5, 2010 (JP) .................................. 2010-176706
Jun. 22, 2011 (JP) .................................. 2011-138895

(51) Int. Cl.
*G06F 3/12* (2006.01)
(52) U.S. Cl.
CPC ............ *G06F 3/1288* (2013.01); *G06F 3/1263* (2013.01); *G06F 3/1212* (2013.01); *G06F 2206/1514* (2013.01); *G06F 3/1264* (2013.01); *G06F 3/1262* (2013.01); *G06F 3/1217* (2013.01)
USPC .......................................... 358/1.15; 358/1.13

(58) Field of Classification Search
None
See application file for complete search history.

(56) References Cited

U.S. PATENT DOCUMENTS 5,847,857 A * 12/1998 Yajima et al. ................ 358/468
7,982,888 B2    7/2011 Yamada et al.
2001/0038461 A1 * 11/2001 Murakami et al. ........... 358/1.13
2001/0054793 A1 * 12/2001 Nakahira et al. ............. 271/298
2007/0201071 A1 *  8/2007 Yamada et al. ............... 358/1.13
2008/0256541 A1 * 10/2008 Rai ................................ 718/101
2009/0303509 A1 * 12/2009 Ozaki ........................... 358/1.9
2010/0044949 A1 *  2/2010 Nakamura .................... 271/3.17
2011/0170143 A1    7/2011 Eom et al.
2011/0222099 A1    9/2011 Mori

FOREIGN PATENT DOCUMENTS

| CN | 101030125 A | 9/2007 |
| EP | 1830249 A | 9/2007 |
| JP | 2000335049 A | 12/2000 |
| JP | 2008-269157 A | 6/2008 |

OTHER PUBLICATIONS

European Office Action dated Jul. 16, 2013 in corresponding Patent Application No. 11172658.4.
Chinese Office Action dated Sep. 2, 2013 issued in corresponding Chinese Patent Application No. 201110218193.4.

* cited by examiner

*Primary Examiner* — Mark Zimmerman
*Assistant Examiner* — Richa Mishra
(74) *Attorney, Agent, or Firm* — Fitzpatrick, Cella, Harper & Scinto (57) ABSTRACT

An information processing apparatus connected to a print apparatus via a network, comprises: receiving unit configured to receive a plurality of jobs; determination unit configured to determine a priority level of each of the plurality of jobs in an order in which jobs are sent to the print apparatus, based on information of a post-processing step which corresponds to each of the plurality of jobs and is performed after the plurality of jobs are printed by the print apparatus; and sending unit configured to send the plurality of jobs to the print apparatus in accordance with the priority levels in which jobs are sent, which are determined by the determination unit.

9 Claims, 10 Drawing Sheets

| |  |
|---|---|
| DEVICE NAME | ~41 |
| PAPER FEED TRAY INFORMATION | ~42 |
| PAPER DISCHARGE TRAY INFORMATION | ~43 |

FIG. 4B

| | |
|---|---|
| JOB TYPE | ~44 |
| PROCESS INFORMATION | ~45 |
| PAPER INFORMATION | ~46 |

FIG. 5

| 51 | 52 | 53 |
|---|---|---|
| PRINT APPARATUS NAME | PAPER DISCHARGE TRAY INFORMATION | PAPER DISCHARGE STATE |
| PRINT APPARATUS 1 | PAPER DISCHARGE TRAY A | NONE |
|  | PAPER DISCHARGE TRAY B | TEXT |
|  | PAPER DISCHARGE TRAY C | JACKET |

INFORMATION PROCESSING APPARATUS, CONTROL METHOD THEREFOR, AND COMPUTER-READABLE MEDIUM

BACKGROUND OF THE INVENTION

1. Field of the Invention

The present invention relates to an information processing apparatus, a control method thereof, and a computer-readable medium which controls the transmission of a job to a print apparatus which includes a plurality of paper discharge trays.

2. Description of the Related Art

A photobook generation system in a personal computer capable of generating original photobooks by arranging image data in a layout having a plurality of pages has been widely available. This photobook is often generated upon assembling a plurality of types of parts such as a text, a cover, and a band before being output as a print product. It is a common practice in photobook generation to execute post-processing using separate post-processing apparatuses of the respective parts after their printing in accordance with the characteristics of these parts. Hence, in order to save the trouble of sorting and conveying print products to the post-processing apparatuses, it is desirable to collectively discharge the same types of print products to the same paper discharge tray.

As an example where sending a plurality of types of jobs is controlled by determining in which paper discharge tray the printed paper is output in order to prevent print products of a plurality of jobs processed in parallel from mixing in the same paper discharge tray, has been proposed (Japanese Patent Laid-Open No. 2000-335049).

However, Japanese Patent Laid-Open No. 2000-335049 mentioned above presents a proposal concerning paper discharge control for each page in a job, so print products associated with different jobs may get mixed in the same tray and be discharged, depending on the print settings. Also, Japanese Patent Laid-Open No. 2000-335049 does not take into consideration keeping control of the order in which jobs are sent to the print apparatus, based on the type of post-processing step after printing.

SUMMARY OF THE INVENTION

In view of this, the present invention provides a method for controlling the job sending so that identical parts of a plurality of photobooks are discharged to the same paper discharge tray and different parts of these photobooks are not discharged to the same paper discharge tray when printing respective parts of these photobooks. The present invention also provides a method of performing paper discharge control which is based on a post-processing step after printing.

According to one aspect of the present invention, there is provided an information processing apparatus connected to a print apparatus via a network, comprising: receiving unit configured to receive a plurality of jobs; determination unit configured to determine a priority level of each of the plurality of jobs in an order in which jobs are sent to the print apparatus, based on information of a post-processing step which corresponds to each of the plurality of jobs and is performed after the plurality of jobs are printed by the print apparatus; and sending unit configured to send the plurality of jobs to the print apparatus in accordance with the priority levels in which jobs are sent, which are determined by the determination unit.

According to another aspect of the present invention, there is provided a control method for an information processing apparatus connected to a print apparatus via a network, comprising: a receiving step of receiving a plurality of jobs; a determination step of determining a priority level of each of the plurality of jobs in an order in which jobs are sent to the print apparatus, based on information of a post-processing step which corresponds to each of the plurality of jobs and is performed after the plurality of jobs are printed by the print apparatus; and a sending step of sending the plurality of jobs to the print apparatus in accordance with the priority levels in the order in which jobs are sent, which are determined in the determination step.

According to another aspect of the present invention, there is provided a computer-readable medium storing a program for causing a computer to function as: receiving unit configured to receive a plurality of jobs; determination unit configured to determine a priority level of each of the plurality of jobs in an order in which jobs are sent to the print apparatus, based on information of a post-processing step which corresponds to each of the plurality of jobs and is performed after the plurality of jobs are printed by the print apparatus; and sending unit configured to send the plurality of jobs to the print apparatus in accordance with the priority levels in the order in which jobs are sent, which are determined by the determination unit.

According to the present invention, the same types of print products are always output to the same paper discharge tray, so print products can be collectively conveyed to a post-processing apparatus, thus making it possible to shorten the operation time taken for sorting in their conveyance when different types of print products get mixed in the same paper discharge tray. Also, paper discharge is performed in an optimum order based on the details of post-processing steps, thus making it possible to improve the operation efficiency of a photobook generation workflow.

Further features of the present invention will become apparent from the following description of exemplary embodiments with reference to the attached drawings.

DESCRIPTION OF THE EMBODIMENTS

First Embodiment (System Configuration)

Figure 1:
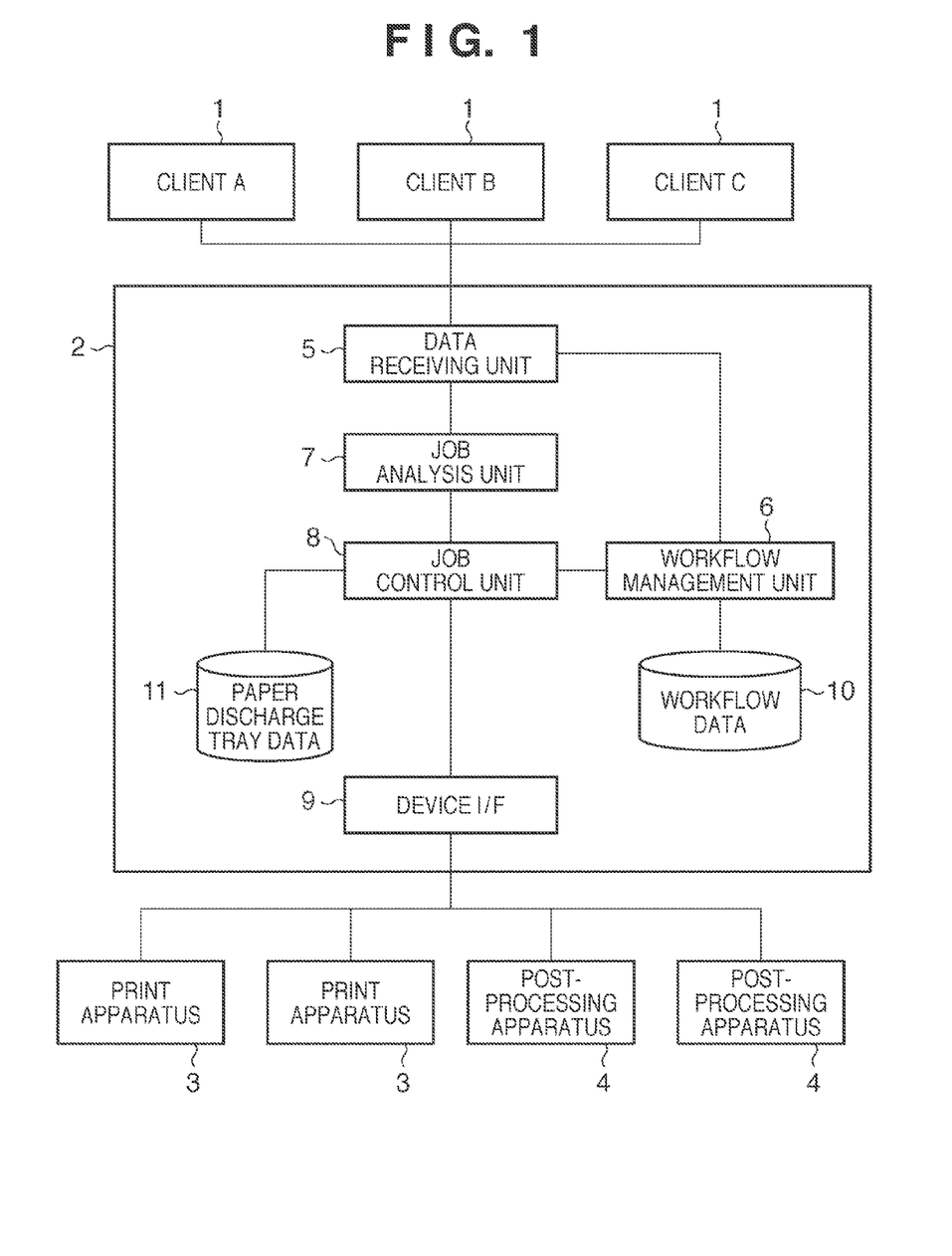
FIG. 1 is a block diagram showing the configuration of a photobook generation system according to an embodiment of the present invention.

A mode for carrying out the present invention will be described below with reference to the accompanying drawings. FIG. 1 is a block diagram illustrating an example of the configuration of a photobook generation system according to an embodiment of the present invention. This photobook generation system includes various apparatuses to which a paper discharge control method according to this embodiment is applicable. This system mainly includes a client 1, information processing apparatus 2, print apparatus 3, and post-processing apparatus 4. The client 1 mainly serves as an environment in which the user edits/generates a layout of a photobook. When the user completes layout editing of a photobook and confirms an order, the client 1 generates a plurality of jobs associated with the photobook generated by the user. The "jobs" include herein one or both of the content information and print setting information to be processed by the print apparatus 3 and post-processing apparatus 4. Note that one or more clients are present.

The information processing apparatus 2 receives jobs and performs printing and post-processing using the print apparatus 3 and post-processing apparatus 4, respectively. The client 1 is connected to the information processing apparatus 2 via a network, and communicates with it via a predetermined medium such as the Internet. The information processing apparatus 2 receives jobs from the client 1, and controls output to the print apparatus 3 and post-processing apparatus 4. The information processing apparatus 2 includes a data receiving unit 5, workflow management unit 6, job analysis unit 7, job control unit 8, device I/F 9, workflow data 10, and paper discharge tray data 11.

The print apparatus 3 interprets, rasterizes, and prints a print job sent via the device I/F 9. The post-processing apparatus 4 interprets a post-processing job sent via the device I/F 9, automatically sets post-processing parameters, and performs post-processing of a print product at the timing at which the print product is set. Examples of the types of post-processing apparatus 4 include a case binding apparatus 35, sheet cutting apparatus 36, scoring apparatus 37, and laminator 38.

The data receiving unit 5 receives data of a print job and post-processing job from the client 1. The workflow management unit 6 manages data which is associated with a workflow set in advance by the user. The received data associated with a workflow is stored in the workflow data 10 and managed. The job analysis unit 7 has a function of analyzing a job received via the data receiving unit 5 to acquire detailed content information and detailed print setting information. The job analysis unit 7 analyzes a job and stores in a memory print setting information or post-processing setting information for the content information.

The job control unit 8 controls output of a job analyzed by the job analysis unit 7, based on the paper discharge tray data 11 and the workflow data 10 managed by the workflow management unit 6. The device I/F 9 is an interface used to control communication between the print apparatus 3 and the post-processing apparatus 4. The device I/F 9 has a function of acquiring capability information, configuration information, and printer connection information from the print apparatus 3 and post-processing apparatus 4, and a function of sending a print job to the print apparatus 3 and a post-processing job to the post-processing apparatus 4. The information processing apparatus 2 holds the workflow data 10 and paper discharge tray data 11. The workflow data 10 will be described in more detail later with reference to FIGS. 4A and 4B, and the paper discharge tray data 11 will be described in more detail later with reference to FIG. 5.

Figure 2:
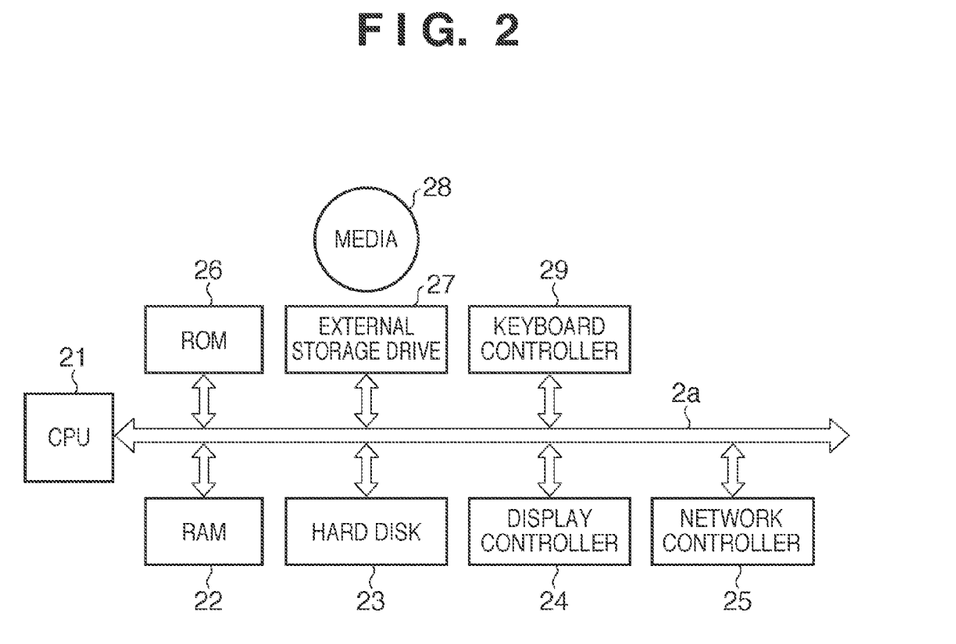
FIG. 2 is a block diagram showing the internal configuration of an information processing apparatus according to the embodiment.

FIG. 2 is a block diagram showing the internal configuration of the information processing apparatus 2. A CPU 21 executes a program stored in the program area of a ROM 26, or programs such as an OS and a general-purpose application loaded from a hard disk 23 into a RAM 22. The RAM 22 functions as, for example, the main memory and work area of the CPU 21. The hard disk 23 stores, for example, a boot program, various applications, font data, a user file, and an electronic document file. Also, all jobs received by the information processing apparatus 2 are sent to the hard disk 23. A display controller 24 controls display on a display device. A network controller 25 executes communication control processing with other devices connected to a network. A keyboard controller 29 controls key inputs from a keyboard or a pointing device (neither is shown). The CPU 21 is connected to each block via an internal bus 2a in the information processing apparatus 2.

(Photobook Generation Step)

Figure 3:
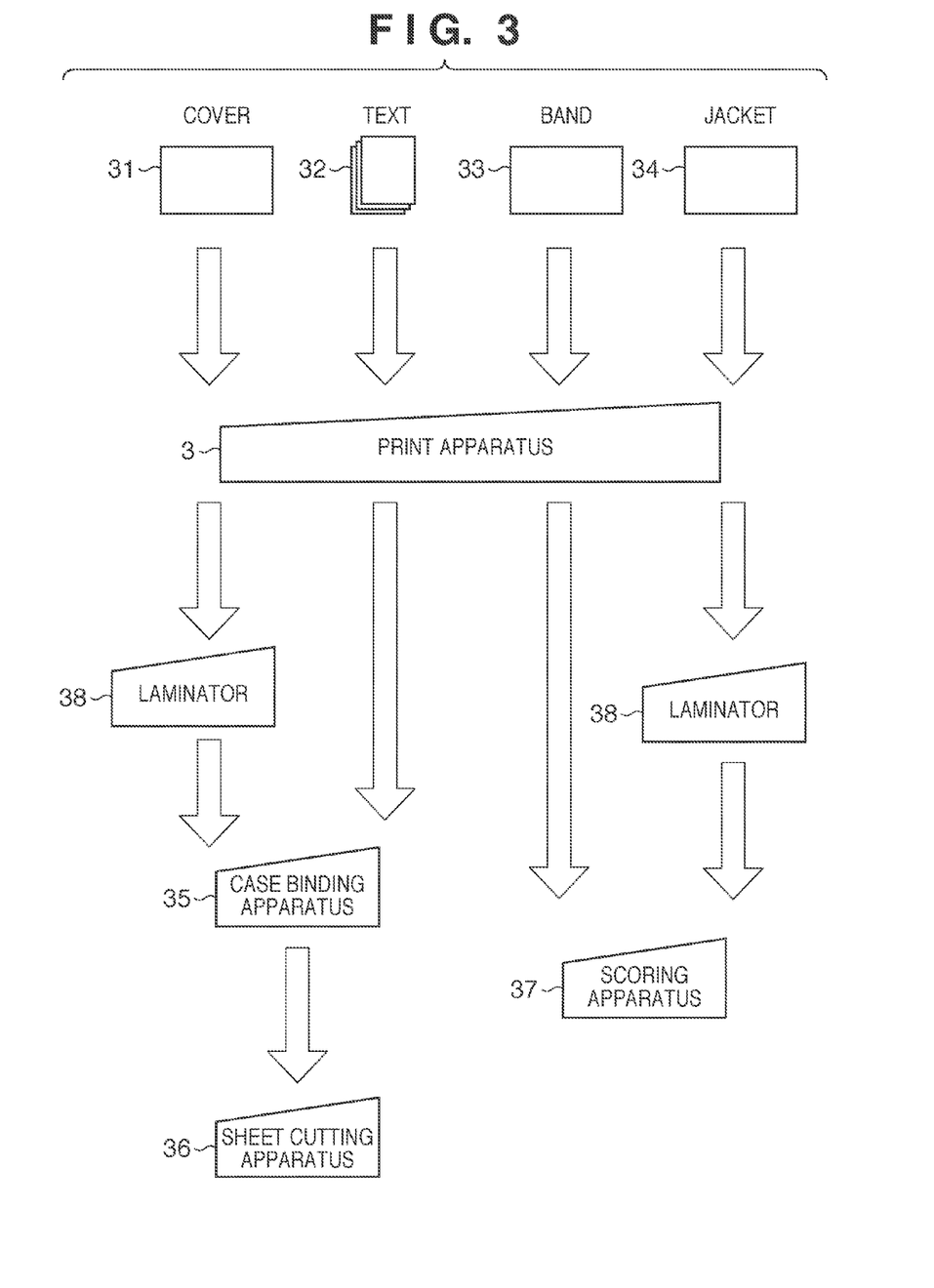
FIG. 3 is a chart illustrating an example of processing steps until photobook generation is completed.

FIG. 3 is a chart illustrating an example of processing steps until photobook generation is completed. In this embodiment, one photobook is generated by combining four types of parts: a cover 31, text 32, band 33, and jacket 34. Referring to FIG. 3, the four types of parts: the cover 31, text 32, band 33, and jacket 34 input to the print apparatus 3 are not paper sheets but print jobs. Paper sheets generated from the print jobs of the cover 31, text 32, band 33, and jacket 34 are defined as a cover 31', text 32', band 33', and jacket 34', respectively. The print apparatus 3 analyzes the input print jobs and prints the four types of paper sheets: the cover 31', text 32', band 33', and jacket 34'. That is, the print apparatus 3 performs print processing of each part. Next, the cover 31' undergoes surface lamination processing by the laminator 38, and is then conveyed to the case binding apparatus 35. The cover 31' and text 32' undergo case binding by the case binding apparatus 35, thereby generating one book. Note that in case binding, print products of the cover 31' and text 32' are manually conveyed to the case binding apparatus 35, and paper sheets used for them are set in different portions.

It is a common practice to read a barcode printed on the cover 31' or text 32' to reflect setting information of this job on post-processing settings sent to the post-processing apparatus 4 in advance. After case binding, the book is cut by the sheet cutting apparatus 36. On the other hand, the band 33 undergoes paper scoring by the scoring apparatus 37. Scoring indicates herein paper creasing processing. The jacket 34 undergoes surface lamination processing by the laminator 38, and then undergoes paper scoring by the scoring apparatus 37. Lastly, the respective parts are assembled together to complete one photobook.

In the above-mentioned way, the respective parts undergo the same processing steps when the print apparatus 3 performs their print processing first, but undergo post-processing steps which are subsequent to their print processing and use different types of processes and different numbers of post-processing apparatuses 4 in accordance with the characteristics of the respective parts.

(Workflow Data)

Figure 4A:
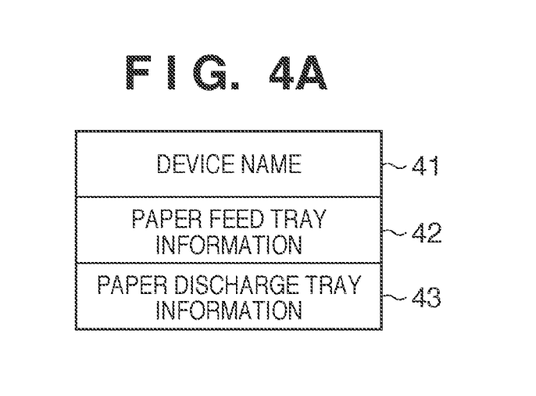
FIGS. 4A and 4B are views illustrating examples of the structures of workflow data managed by a workflow management unit.
Figure 4B:
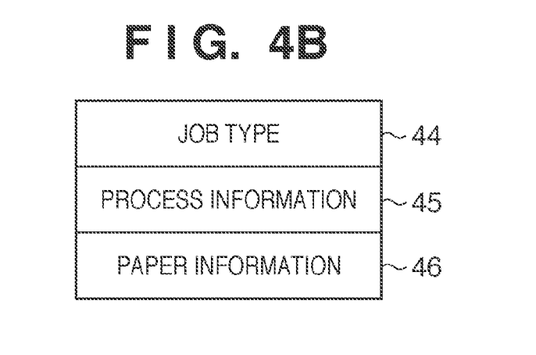

FIGS. 4A and 4B are views illustrating examples of the structures of the workflow data 10 where the data is associated with a workflow and managed by the workflow management unit 6. FIG. 4A shows information associated with the print apparatus 3 and post-processing apparatus 4 which are used in a photobook generation workflow. The above-mentioned information includes three items: a device name 41, paper feed tray information 42, and paper discharge tray information 43. The device name 41 represents names which can be used to uniquely identify the print apparatus 3 and post-processing apparatus 4. Note that other information may be used as long as they can be used to uniquely specify a specific device. The paper feed tray information 42 represents information associated with a paper feed tray serving as a paper feed unit present in a device specified in the device name 41. The information associated with a paper feed tray includes the paper size (for example, A3 or A4) and the paper type (for example, plain paper, recycled paper, or glossy paper). The paper discharge tray information 43 represents information associated with a paper discharge tray present in a device specified in the device name 41. The information associated with a paper discharge tray includes, for example, the number of paper discharge trays. Note that the paper feed tray information 42 and paper discharge tray information 43 are set only when the type of device name 41 is a "Print Apparatus".

FIG. 4B shows information associated with a job processed in this workflow. The information associated with a job includes a job type 44, process information 45, and paper information 46. The job type 44 represents the type of job processed in this workflow. In this embodiment, four types of jobs: a cover, text, band, and jacket are processed. The process information 45 represents information indicating the types of devices used to process jobs specified in the job type 44, and the order of processing of these jobs. This information can also be used to identify information of a post-processing step subsequent to print processing. In this embodiment, each part is processed using the devices in the following orders.

Cover 31: Print Apparatus 3, Laminator 38, Case Binding Apparatus 35, and Sheet Cutting Apparatus 36, Text 32: Print Apparatus 3, Case Binding Apparatus 35, and Sheet Cutting Apparatus 36, Band 33: Print Apparatus 3 and Scoring Apparatus 37, Jacket 34: Print Apparatus 3, Laminator 38, and Scoring Apparatus 37.

The paper information 46 represents information associated with paper used for the job type 44. The information associated with paper includes, for example, the paper size and the paper type (for example, plain paper, recycled paper, or glossy paper). The job control unit 8 refers to information associated with a device and information associated with a job, which are used in the photobook generation workflow as described above, thereby controlling the sending of each job.

(Paper Discharge Tray Data)

Figure 5:
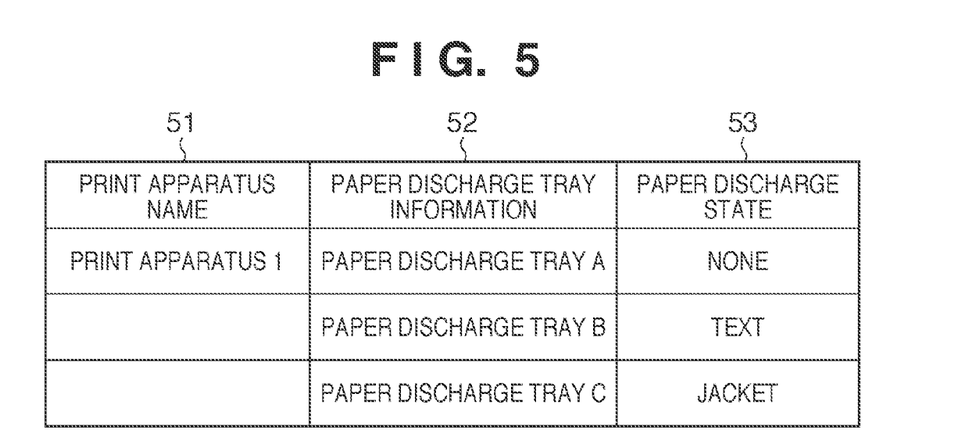
FIG. 5 is a table illustrating an example of the structure of paper discharge tray data managed by a job control unit.

FIG. 5 is a table illustrating an example of the structure of the paper discharge tray data 11 managed by the job control unit 8. The paper discharge tray data 11 serves as a table which manages the states of the paper discharge trays provided in the print apparatus 3, and includes a print apparatus name 51, paper discharge tray information 52, and paper discharge state 53. The print apparatus name 51 represents a name used to identify a print apparatus currently being managed. In this case, the print apparatus name 51 indicates the state in which "Print Apparatus 1" is managed. Note that other information may be used as long as they can be used to uniquely specify a specific print apparatus. The paper discharge tray information 52 represents the information associated with the paper discharge trays provided in the print apparatus set for the print apparatus name 51. In this case, the paper discharge tray information 52 indicates that "Print Apparatus 1" includes three paper discharge trays serving as paper discharge units: "Paper Discharge Tray A" to "Paper Discharge Tray C".

The paper discharge state 53 indicates the type of job, a print product of which is discharged, among job types 44 set in the workflow data 10 for each paper discharge tray set for the paper discharge tray information 52. For example, as shown in FIG. 5, "None" is set when no paper is discharged, and "Text" is set when paper corresponding to a job of the text 32 is discharged. The paper discharge tray data 11 is referred to or updated in processing one job by the job control unit 8 or upon a change in paper discharge state of each paper discharge tray of the print apparatus 3. In the above-mentioned way, the job control unit 8 stores, updates, and refers to the current paper discharge state of each paper discharge tray, thereby controlling the sending of each job.

(Job Sending Control Processing)

Figure 6:
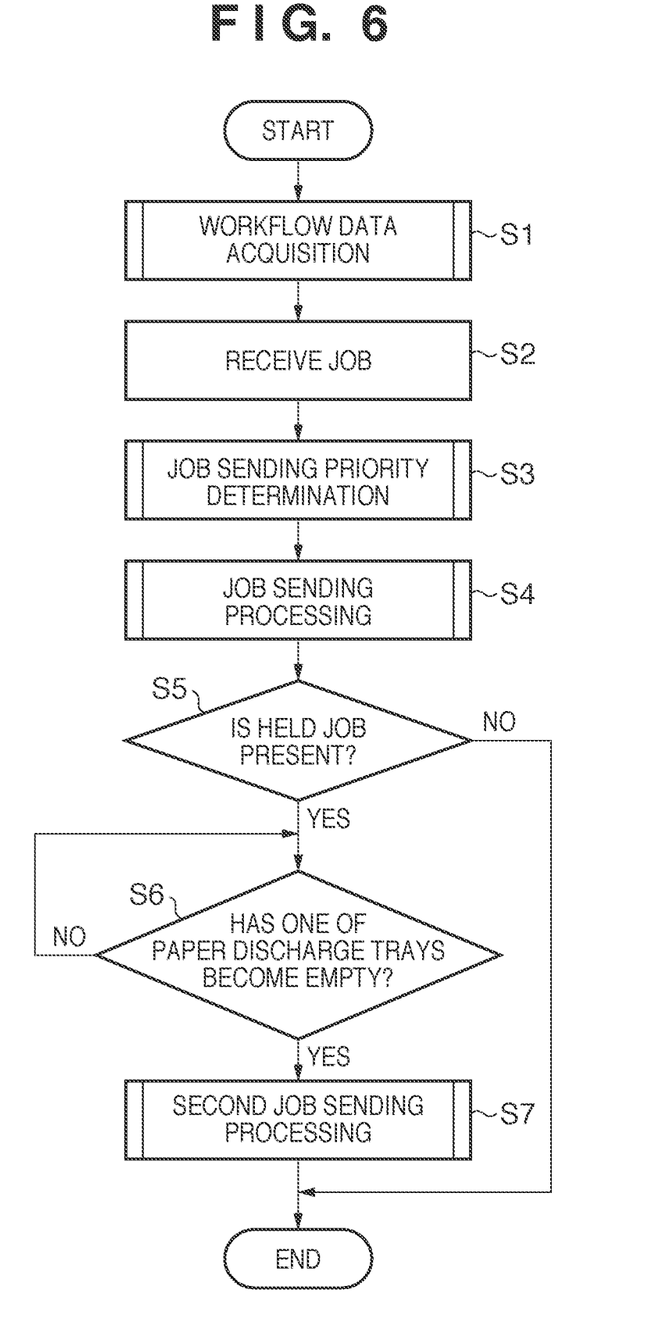
FIG. 6 is a flowchart illustrating an example of job sending control processing by the information processing apparatus according to the first embodiment.

An example of job sending control processing by the information processing apparatus 2 in the first embodiment will be described next with reference to a flowchart shown in FIG. 6. A program according to this sequence is stored in the hard disk 23 of the information processing apparatus 2 is read out into the RAM 22, and is then executed by the CPU 21.

First, in step S1, the data receiving unit 5 acquires the workflow data 10 input by the user. The acquired workflow data 10 is managed by the workflow management unit 6. Details of the workflow data 10 are those having been described with reference to FIGS. 4A and 4B. Workflow data acquisition processing in this case will be described in more detail later with reference to FIG. 7. In step S2, the data receiving unit 5 receives a job sent from the client 1. In this processing, only one job may be received or a plurality of jobs may be received at once. After completion of job reception, the job analysis unit 7 analyzes the type of job and the setting details of this job, and sends these pieces of information to the job control unit 8.

In step S3, the job control unit 8 determines the priority levels of jobs to be sent to the print apparatus 3. In this case, the type of job to be sent to the print apparatus 3 with higher priority is determined for each of the received types of jobs. This step will be described in more detail with reference to FIG. 8. In step S4, the job control unit 8 performs job sending control processing. In this case, control is performed so as to determine the type of print apparatus 3 and the type of paper discharge tray of this print apparatus 3, to which each job is sent, or determine that this job is to be held without being sent. This step will be described in more detail with reference to FIG. 9.

In step S5, the job control unit 8 determines whether or not a job held after step S4 is present. If a held job is present (YES in step S5), the process advances to step S6; otherwise (NO in step S5), this sequence ends. In step S6, the job control unit 8 determines whether or not one of the paper discharge trays of the print apparatus 3 has become empty. In this step, the job control unit 8 may periodically acquire the states of the paper discharge trays of the print apparatus 3 via the device I/F 9, or the print apparatus 3 may notify the job control unit 8 of these states via the device I/F 9 at the timing when one of the paper discharge trays of the print apparatus 3 becomes empty. Also, the print apparatus 3 includes a sensor for detecting paper sheets in the paper discharge trays of the print apparatus 3, and a camera for monitoring the states of these paper discharge trays, thereby being capable of detecting changes such as discharge of paper from each paper discharge tray or removal of paper from this paper discharge tray.

If one of the paper discharge trays of the print apparatus 3 has become empty (YES in step S6), the process advances to step S7. While none of the paper discharge trays of the print apparatus 3 has become empty (NO in step S6), this step continues to be executed until one paper discharge tray becomes empty. However, the user is desirably prompted to allow printing of the held job by performing processing of, for example, transmitting a message for prompting the user to empty one paper discharge tray at an arbitrary timing. In step S7, the job control unit 8 sends the held job to the print apparatus 3. This step will be described in more detail with reference to FIG. 10. After completion of this step, this sequence ends.

(Workflow Data Acquisition Processing)

Figure 7:
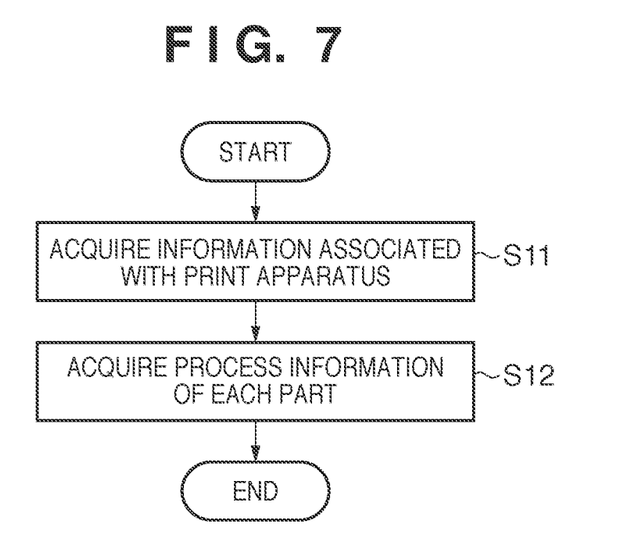
FIG. 7 is a flowchart illustrating an example of workflow data acquisition processing by the workflow management unit according to the first embodiment.

FIG. 7 is a flowchart illustrating an example of processing of acquiring the workflow data 10 by the workflow management unit 6 in the first embodiment. First, in step S11, the workflow management unit 6 acquires the name of the print apparatus 3 and the pieces of information associated with the paper feed tray and paper discharge trays of the print apparatus 3, which are input by the user. The workflow management unit 6 registers the pieces of acquired information in the device name 41, paper feed tray information 42, and paper discharge tray information 43 of the workflow data 10 shown in FIG. 4A.

In step S12, the workflow management unit 6 acquires the type of job used in this workflow, the process information of each type of job, and the paper information, which are input by the user. The workflow management unit 6 registers the pieces of acquired information in the job type 44 and process information 45 of the workflow data 10 having been presented with reference to FIG. 4B.

With the above-mentioned processing, the workflow management unit 6 holds pieces of information necessary for job sending priority determination processing (S3) and job sending control processing (S4) to be performed subsequently, and the job analysis unit 7 and job control unit 8 refers to these pieces of information as needed.

(Job Sending Priority Determination Processing)

Figure 8:
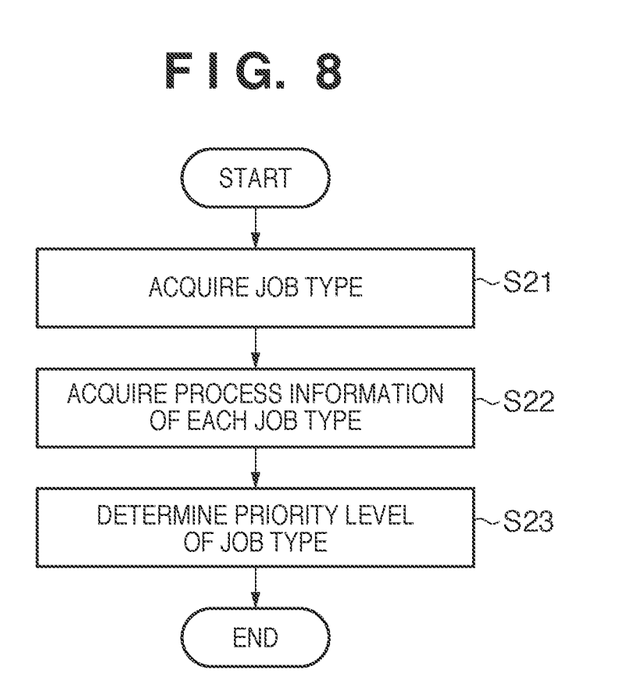
FIG. 8 is a flowchart illustrating an example of job sending priority determination processing by the job control unit according to the first embodiment.

FIG. 8 is a flowchart illustrating an example of processing of determining the priority levels of jobs, which are to be executed by the job control unit 8, in sending them in the first embodiment. First, in step S21, the job control unit 8 acquires the type of job to be processed. The "type of job" indicates herein the job type 44 in the workflow data 10 having been described with reference to FIG. 4B, and is acquired from specific data in the workflow data 10 via the workflow management unit 6.

In step S22, the job control unit 8 acquires the process information 45 corresponding to the job type 44 for each job type acquired in step S21. In this step, as in step S21, specific data in the workflow data 10 is referred to via the workflow management unit 6. Lastly, in step S23, the job control unit 8 determines, using the process information 45 of each type of job, the priority levels of jobs, which define the type of job to be sent with higher priority, when a plurality of types of jobs are present. In this embodiment, the cover 31 requires three post-processing steps, the text 32 and jacket 34 each require two post-processing steps, and the band 33 requires one post-processing step, so the job of the cover 31, which requires the largest number of post-processing steps, is sent first. The remaining jobs are sent upon determining the order of the text 32, jacket 34, and band 33 as the order of priority of sending. Note that the reason why a part which requires a larger number of post-processing steps is sent with higher priority is that the time taken for post-processing gets longer as the number of post-processing steps increases, so post-processing is started earlier for this part to shorten the overall time taken to generate an album. When different jobs use an equal number of post-processing steps, as exemplified by the text 32 and jacket 34 in this embodiment, their priority levels may be determined from additional information. For example, because the number of pages is larger in print data of the text 32 than in that of the jacket 34, a method of determination so that the jacket 34 which has a smaller number of pages and therefore requires less time for printing is sent/printed with higher priority, for example, can be employed. This makes it possible to empty one paper discharge tray earlier, thus processing the held job earlier.

(Job Sending Processing)

Figure 9:
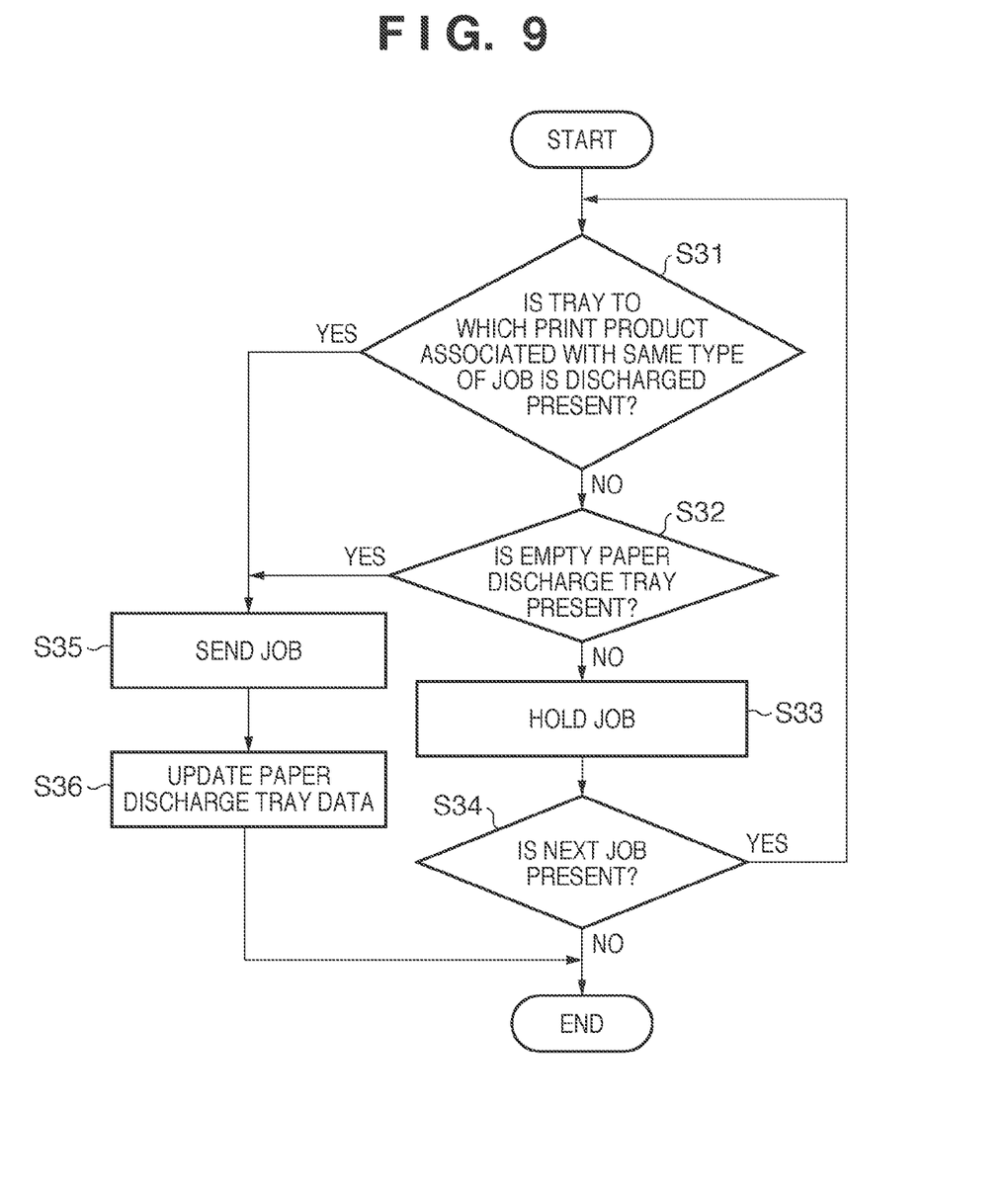
FIG. 9 is a flowchart illustrating an example of job sending processing by the job control unit according to the first embodiment.

FIG. 9 is a flowchart illustrating an example of job sending processing by the job control unit 8 in the first embodiment. First, in step S31, the job control unit 8 refers to the priority levels of jobs in sending, which are determined in step S23, to determine whether a tray to which a print product associated with the same type of job as the type of job (a job to be sent) with a high priority level is discharged is present. This determination is performed by searching for the information of the paper discharge state 53 of each paper discharge tray provided in the print apparatus 3 that is the sending destination, which is registered in the paper discharge tray data 11. If no above-mentioned tray is present (NO in step S31), the process advances to step S32. If the above-mentioned tray is present (YES in step S31), the process advances to step S35, in which a job with a high priority level is sent to the print apparatus 3. In step S35, a print product (paper) printed upon interpreting the job by the print apparatus 3 is discharged to the tray to which a print product associated with the same type of job as the above-mentioned job is discharged. After processing in step S35, the process advances to step S36, in which the paper discharge tray data 11 is updated. In this case, the paper discharge state 53 remains the same, and therefore is not updated.

In step S32, the job control unit 8 determines whether an empty paper discharge tray is present among the paper discharge trays provided in the print apparatus 3 that is the job sending destination. In this step, as in step S31, determination is performed by searching for the information of the paper discharge state 53 in the paper discharge tray data 11. If no empty tray is present (NO in step S32), the process advances to step S33. If an empty tray is present (YES in step S32), the process advances to step S35, the job control unit 8 sends the job to the empty paper discharge tray. In step S36, since the job is sent to a paper discharge tray for which "None" is set as the paper discharge state 53, the job control unit 8 updates the paper discharge tray data 11 by setting the type of the sent job for the item of the paper discharge state 53.

In step S33, if a print product associated with the same type of job is not discharged, and no empty paper discharge tray is present, the job control unit 8 holds the job (makes it on standby) to be processed in the information processing apparatus 2, and therefore does not send this job to the print apparatus 3. Note that if the job is sent to one paper discharge tray without holding it, print products associated with different types of jobs are output to the same paper discharge tray, and therefore mix with each other. Processing in this step makes it possible to prevent print products associated with different types of jobs from getting mixed in the same paper discharge tray. Lastly, in step S34, the job control unit 8 determines whether or not a job to be processed next (a job with a second higher priority level) is present. If the above-mentioned job is present (YES in step S34), the process returns to step S31, in which this sequence is repeated for this next job. If the above-mentioned job is not present (NO in step S34), this sequence ends. Note that this sending processing is defined as the first sending processing (means) in distinction from the second sending processing (means) to be described below.

(Second Job Sending Processing)

Figure 10:
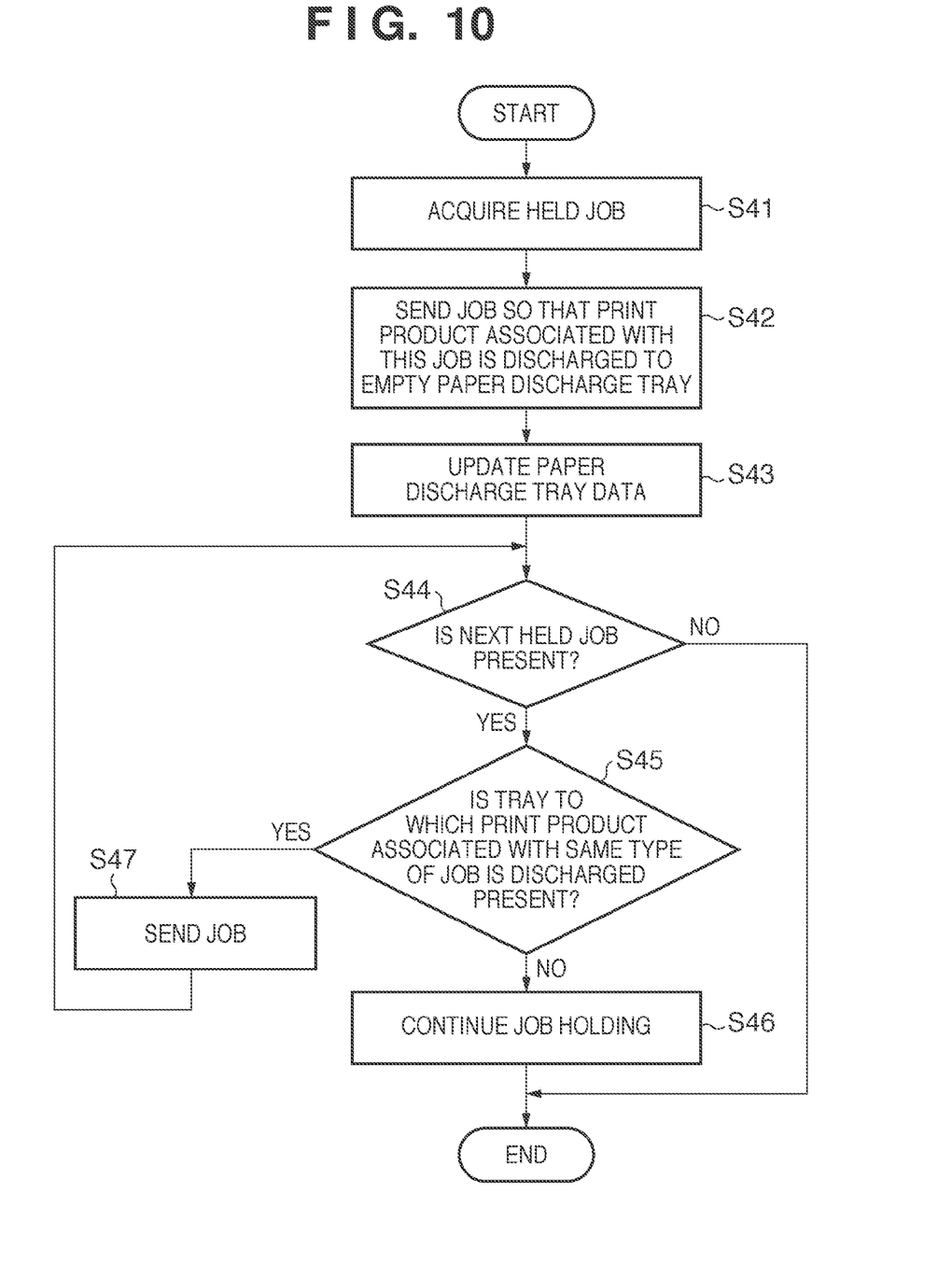
FIG. 10 is a flowchart illustrating an example of second job sending processing by the job control unit according to the first embodiment.

FIG. 10 is a flowchart illustrating an example of the second job sending processing by the job control unit 8 when one of the paper discharge trays of the print apparatus 3 becomes empty upon removing a print product from it in the first embodiment. When the job control unit 8 detects that a print product is removed from one of the paper discharge trays, it acquires the job held in the information processing apparatus 2 (S41).

In step S42, the job control unit 8 sends the job to the empty paper discharge tray. Note that if a plurality of types of held jobs are present, they are sent in accordance with the priority levels of jobs in sending, which are determined in step S3 of FIG. 6. In step S43, the job control unit 8 updates the paper discharge tray data 11. In step S44, the job control unit 8 determines whether another held job remains. If no more job remains (NO in step S44), it is determined that all the held jobs have been sent, and this sequence ends. If another job remains (YES in step S44), the process advances to step S45.

In step S45, the job control unit 8 determines whether a tray to which a print product associated with the same type of job as the job to be processed next is discharged is present. In this step, the same processing as in step S31 of FIG. 9 is executed. If a paper discharge tray to which a print product associated with the same type of job is discharged is present (YES in step S45), the process advances to step S47, in which a job is sent to this tray, and the process returns to step S44. If no paper discharge tray to which a print product associated with the same type of job is present (NO in step S45), the process advances to step S46, the job control unit 8 continues job holding.

With the above-mentioned sequence, a job held in the information processing apparatus 2 can be sent to an empty discharge tray at the timing at which one of the paper discharge trays of the print apparatus becomes empty. At the same time, control is performed so as to prevent different types of jobs from being sent to the same paper discharge tray.

(Output Example)

Figure 11A:
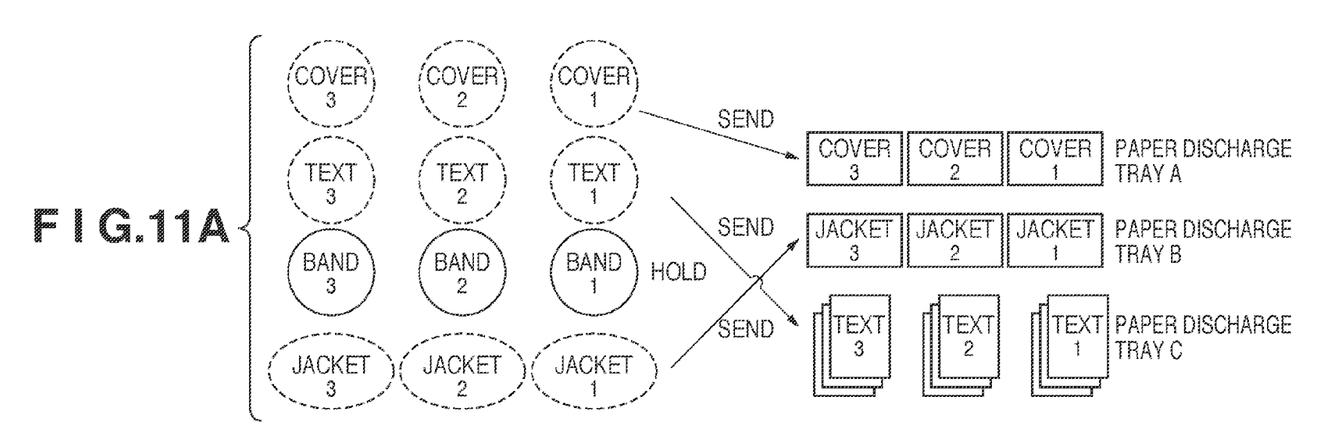
FIGS. 11A and 11B are views illustrating examples of the states of jobs and paper discharge trays according to the first embodiment.
Figure 11B:
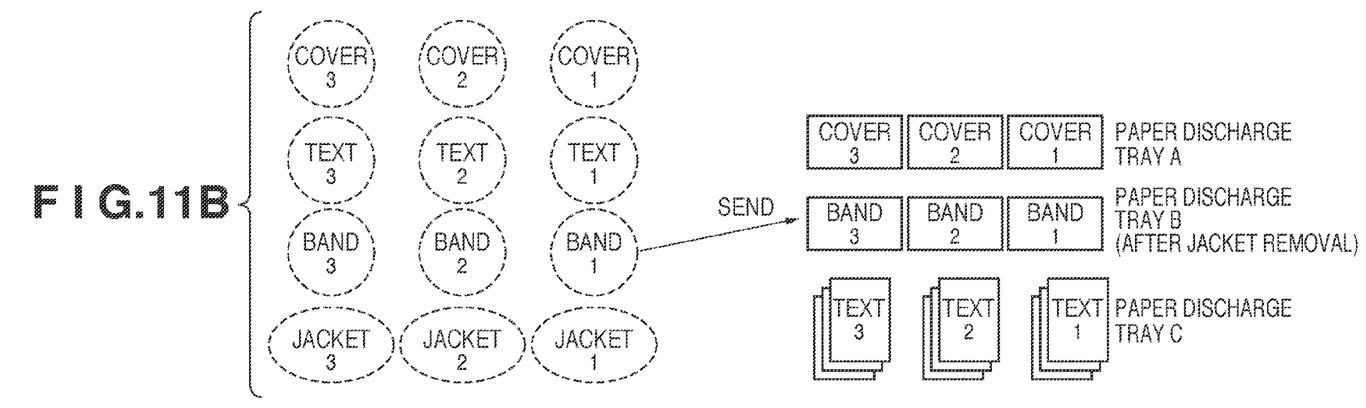

FIGS. 11A and 11B are views illustrating examples of the job sending states and the states of paper discharge trays upon executing the sequence according to the first embodiment. In this example, three sets of jobs of photobooks each formed from four types of parts: a cover, text, band, and jacket are sent from the client 1 to the information processing apparatus 2. Also, the print apparatus 3 which prints these jobs includes three paper discharge trays A to C.

FIG. 11A shows the job sending states and the states of paper discharge trays after the jobs are printed by the print apparatus 3 and print products are discharged to the paper discharge trays. First, upon receiving the above-mentioned jobs from the client 1, the job control unit 8 acquires the types of these jobs (S21) as well as the process information 45 of each type of job (S22). In this case, the four types of parts: the cover, text, band, and jacket, and the process information 45 of each part are acquired from the workflow data 10 via the workflow management unit 6. The priority levels of parts, which define the type of part to be sent with higher priority, are determined from the pieces of acquired information (S23). In this case, it is determined that the cover, jacket, text, and band are to be discharged with higher priority in this order.

When jobs of the first photobook are received, a job of the cover (cover 1) is processed first among these jobs. Because all the paper discharge trays of the print apparatus 3 are empty, a print product of the cover is discharged to an arbitrary paper discharge tray (discharged to paper discharge tray A in this case). Similarly, jobs of the jacket (jacket 1) and the text (text 1) are printed, and print products of these jobs are discharged to paper discharge trays B and C, respectively.

Lastly, a job (band 1) of the band is processed. In this case, neither a tray to which a print product associated with the same type of job is discharged, nor an empty tray is present, so the job of the band is held in the information processing apparatus 2. The same processing is performed upon receiving jobs of the second and third photobooks as well, so jobs of the cover, jacket, and text are sent so that print products associated with these jobs are discharged to paper discharge trays A, B, and C, respectively, and only a job of the band is held in the information processing apparatus 2.

FIG. 11B is a view showing the job sending states and the states of paper discharge trays after the print products of the jackets are removed from paper discharge tray B. Upon removing the print products of the jackets from paper discharge tray B, a message indicating that paper discharge tray B has become empty is transmitted to the job control unit 8. After that, the job control unit 8 acquires the held job of band 1, and sends an instruction to discharge this job to empty paper discharge tray B to the print apparatus 3. Also, because a print product of band 1 having the same type of job as jobs of bands 2 and 3 is discharged to paper discharge tray B, the jobs of bands 2 and 3 are sent to paper discharge tray B.

As has been described above, in a workflow in which a print product formed form a plurality of types of jobs is generated using the print apparatus 3 and post-processing apparatus 4, if a tray to which a print product associated with the same type of job as the job of interest has already been discharged is present, a print product of this job is discharged to this tray. Also, if an empty paper discharge tray is present, the job of interest is discharged to this tray. Moreover, if even an empty paper discharge tray is absent, the job of interest is held, thereby making it possible to output a print product of the same type of job to the same paper discharge tray. This obviates the need to perform an operation of grouping together print products of the same type when conveying print products to the post-processing apparatus 4, thus making it possible to improve the operation efficiency of the operator. In other words, it is possible to prevent paper sheets to undergo different types of processing from mixing in the same paper discharge tray. Also, the priority levels of jobs in sending are determined in consideration of the number of post-processing steps for each job. Therefore, a job which requires a larger number of post-processing steps can be sent to the print apparatus with higher priority than other types of jobs, and therefore can undergo post-processing with higher priority than other types of jobs, thus making it possible to improve the workflow efficiency of the entire system.

Second Embodiment

In the first embodiment, the type of job to be executed with higher priority is determined based on process information of post-processing for each type of job. However, in this case, whether the paper used by each job is fed is not taken into consideration. Hence, even if a specific job is sent with higher priority, unless paper used by this job is set, the printing processing stops, requiring much time to replace the paper, and the operation efficiency deteriorates. In view of this, the second embodiment gives an example in which job sending is controlled upon determining, as a priority index, whether paper used by each job is fed in a print apparatus.

(Job Sending Priority Determination Processing)

Figure 12:
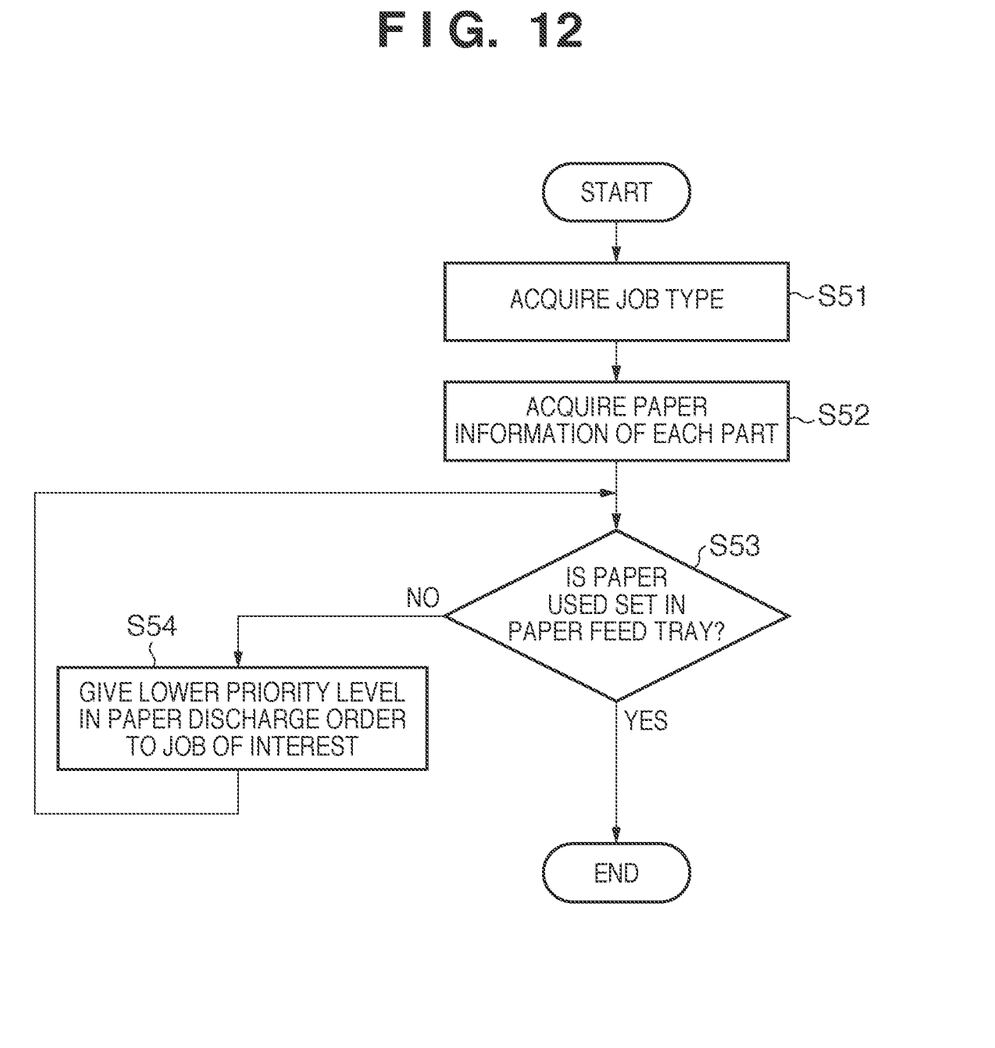
FIG. 12 is a flowchart illustrating an example of job sending priority determination processing by a job control unit according to the second embodiment.

FIG. 12 is a flowchart illustrating an example of processing which determines, by a job control unit 8, the priority levels of jobs in sending in the second embodiment. This processing corresponds to FIG. 8 in the first embodiment. First, in step S51, the job control unit 8 acquires the type of job registered in this workflow. In this step, the same processing as in step S21 of FIG. 8 is executed. In step S52, the job control unit 8 acquires paper information used for each part by the corresponding job. This is the paper information 46 which was described with reference to FIG. 4B, and is acquired from a workflow data 10 via a workflow management unit 6.

In step S53, the job control unit 8 acquires paper information set for a paper feed tray from a print apparatus 3 to determine whether paper used by the job to be processed is set in this paper feed tray. If the above-mentioned paper is not set (NO in step S53), the process advances to step S54, in which the job of interest is given a low priority level to be sent because the paper required by this job is not set and therefore this job cannot be printed even if the data was sent. If paper used is set in a paper feed tray (YES in step S53), this processing sequence ends. Note that information which is sent from the print apparatus 3 and is associated with whether paper is set in a paper feed tray may be held in association with, for example, the paper feed tray information 42 shown in FIG. 4A.

In the above-mentioned way, the priority levels of the sending of jobs are determined based on whether paper used by each job is set in the print apparatus 3, thereby making it possible to save a lot of print standby time that occurs when paper remains unset. Also, when a plurality of job types are mixed with each other, it is possible to avoid the frequent replacement of paper of each job, thus leading to an improvement in operation efficiency.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-176706, filed Aug. 5, 2010, and 2011-138895 filed Jun. 22, 2011, which are hereby incorporated by reference herein in their entirety.

What is claimed is:

1. An information processing apparatus connected to a print apparatus via a network, comprising:
    determination unit configured to determine, based on a number of post-processing apparatuses corresponding to each of parts among a plurality of different parts that constitutes a book, an order in which jobs corresponding to each of the parts are sent to the print apparatus; and
    sending unit configured to send the jobs corresponding to each of the parts to the print apparatus in accordance with the order in which jobs are sent, which are determined by said determination unit,
    wherein the determination unit determines the order so that a job corresponding to a part which requires a larger number of post-processing apparatuses is sent earlier than a job corresponding to a part which requires a smaller number of post-processing apparatuses.

2. The apparatus according to claim 1, wherein said determination unit determines the order such that a job which requires a larger number of post-processing apparatuses is sent earlier.

3. The apparatus according to claim 1, wherein
    said print apparatus includes a plurality of paper discharge units, and
    said sending unit determines whether a paper discharge unit to which a print product corresponding to an identical type of job to a job to be sent, which is determined in accordance with the order, is discharged is present among said plurality of paper discharge units, and sends the job to be sent so that a print product corresponding to the job to be sent is discharged to the paper discharge unit if it is determined that the paper discharge unit is present.

4. The apparatus according to claim 3, wherein if it is determined that no paper discharge unit to which a print product corresponding to an identical type of job to a job to be sent, which is determined in accordance with the order, is discharged is present among said plurality of paper discharge units, said sending unit further determines whether a paper discharge unit to which no print product is discharged is present among said plurality of paper discharge units, and stands by to send the job to be sent to the print apparatus if it is determined that no paper discharge unit to which no print product is discharged is present.

5. The apparatus according to claim 3, wherein if it is determined that no paper discharge unit to which a print product corresponding to an identical type of job to a job to be sent, which is determined in accordance with the order, is discharged is present among said plurality of paper discharge units, said sending unit further determines whether a paper discharge unit to which no print product is discharged is present among said plurality of paper discharge units, and sends the job to be sent to the print apparatus so that a print product corresponding to the job to be sent is discharged to the paper discharge unit.

6. The apparatus according to claim 4, further comprising:
    standby job sending unit configured, if a job which is on standby without being sent to the print apparatus by said sending unit is present, to send the job on standby to the print apparatus at a timing, at which it is detected that one of said plurality of paper discharge units has no print product, so that a print product corresponding to the job on standby is discharged to the paper discharge unit having no print product.

7. The apparatus according to claim 1, wherein
    said print apparatus includes a plurality of paper feed units, and
    said determination unit determines whether paper corresponding to a job to be sent, which is determined in accordance with the order, is fed in one of said plurality of paper feed units, and sets an order for the job to be lower when it is determined that the paper corresponding to the job is not fed in the paper feed unit than when it is determined that the paper corresponding to the job is fed in the paper feed unit.

8. A control method for an information processing apparatus connected to a print apparatus via a network, comprising:
- a determination step of determining, based on a number of post-processing apparatuses corresponding to each of parts among a plurality of different parts that constitutes a book, an order in which jobs corresponding to each of the parts are sent to the print apparatus; and
- a sending step of sending the jobs corresponding to each of the parts to the print apparatus in accordance with the order in which jobs are sent, which are determined in the determination step,
- wherein, in the determination step, the order is determined so that a job corresponding to a part which requires a larger number of post-processing apparatuses is sent earlier than a job corresponding to a part which requires a smaller number of post-processing apparatuses.

9. A non-transitory computer-readable medium storing a program for causing a computer to function as:
- determination unit configured to determine, based on a number of post-processing apparatuses corresponding to each of parts among a plurality of different parts that constitutes a book, an order in which jobs corresponding to each of the parts are sent to the print apparatus; and
- sending unit configured to send the jobs corresponding to each of the parts to the print apparatus in accordance with the order in which jobs are sent, which are determined by the determination unit,
- wherein the determination unit determines the order so that a job corresponding to a part which requires a larger number of post-processing apparatuses is sent earlier than a job corresponding to a part which requires a smaller number of post-processing apparatuses.

* * * * *